US012592941B2

(12) United States Patent
Xiao et al.

(10) Patent No.: US 12,592,941 B2
(45) **Date of Patent: \*Mar. 31, 2026**

(54) METHOD AND SYSTEM FOR PROVIDING DNS SECURITY USING PROCESS INFORMATION

(71) Applicant: Palo Alto Networks, Inc., Santa Clara, CA (US)

(72) Inventors: Zihang Xiao, Los Gatos, CA (US); Zhanhao Chen, Sunnyvale, CA (US)

(73) Assignee: Palo Alto Networks, Inc., Santa Clara, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/734,883

(22) Filed: Jun. 5, 2024

(65) Prior Publication Data

US 2024/0323206 A1     Sep. 26, 2024

Related U.S. Application Data

(63) Continuation of application No. 18/077,516, filed on Dec. 8, 2022, now Pat. No. 12,034,745, which is a continuation of application No. 17/724,130, filed on Apr. 19, 2022, now Pat. No. 11,582,247.

(51) Int. Cl.
*H04L 9/40* (2022.01)

(52) U.S. Cl.
CPC ...... *H04L 63/1416* (2013.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 7,970,765 B1 * | 6/2011 | Olsen | ..................... | H04L 61/58 707/737 |
| 8,489,637 B2 * | 7/2013 | Patil | ................... | H04L 63/0236 707/783 |
| 9,264,440 B1 * | 2/2016 | Stern | .................. | H04L 63/1408 |

(Continued)

FOREIGN PATENT DOCUMENTS

| | | |
|---|---|---|
| CN | 102577303 | 7/2012 |
| CN | 105681133 | 6/2016 |

(Continued)

OTHER PUBLICATIONS

Annonymous, "Introduction", https://docs.umbrella.com/deployment-umbrella/docs/1-introduction-1#work, accessed Feb. 7, 2022.

(Continued)

*Primary Examiner* — Joseph P Hirl
*Assistant Examiner* — Hassan Saadoun
(74) *Attorney, Agent, or Firm* — Van Pelt, Yi & James LLP

(57) ABSTRACT

Domain Name System (DNS) security using process information is provided. An application accessing an internet service using a domain name is determined. Process information associated with the application along with an associated DNS query to identify an IP address associated with the domain name are identified. The process information and the associated DNS query to a DNS security service are sent. An action based on a response from the DNS security service is performed.

13 Claims, 8 Drawing Sheets

(56) References Cited

U.S. PATENT DOCUMENTS

| | | | |
|---|---|---|---|
| 2012/0303808 | A1 | 11/2012 | Xie |
| 2015/0180892 | A1 | 6/2015 | Balderas |
| 2016/0149938 | A1 | 5/2016 | Barak |
| 2016/0261608 | A1* | 9/2016 | Hu .......................... H04L 63/10 |
| 2016/0261626 | A1* | 9/2016 | Hu ...................... H04L 63/1441 |
| 2017/0126706 | A1* | 5/2017 | Minea ................. H04L 63/1408 |
| 2017/0180380 | A1 | 6/2017 | Bagasra |
| 2018/0013775 | A1 | 1/2018 | Jee |
| 2019/0081958 | A1 | 3/2019 | Lee |
| 2019/0222589 | A1* | 7/2019 | Kislitsin ............. H04L 63/0236 |
| 2019/0238576 | A1* | 8/2019 | Weber ................. H04L 61/4511 |
| 2020/0287913 | A1* | 9/2020 | Buck ...................... H04L 63/14 |
| 2021/0105289 | A1 | 4/2021 | Desai |
| 2021/0160254 | A1* | 5/2021 | Rosenberg ............. H04L 63/20 |
| 2022/0021686 | A1 | 1/2022 | Singh |
| 2022/0053007 | A1* | 2/2022 | Duda ..................... H04L 41/12 |

FOREIGN PATENT DOCUMENTS

| | | |
|---|---|---|
| JP | 2008532133 | 8/2008 |
| JP | 2011076188 | 4/2011 |
| WO | 2008084729 | 7/2008 |
| WO | 2016140037 | 9/2016 |

OTHER PUBLICATIONS

Sivakorn et al., "Countering Malicious Processes with Process—DNS Association", Slides, NDSS 2019.

Sivakorn, S. et al., Countering Malicious Processes with Process—DNS Association, Network and Distributed Systems Security (NDSS) Symposium 2019, Feb. 2019, pp. 1-15.

Sun et al., "Detecting Malware Injection with Program—DNS Behavior." 2020 IEEE European Symposium on Security and Privacy (EuroS&P). IEEE, 2020.

* cited by examiner

Figure 2:
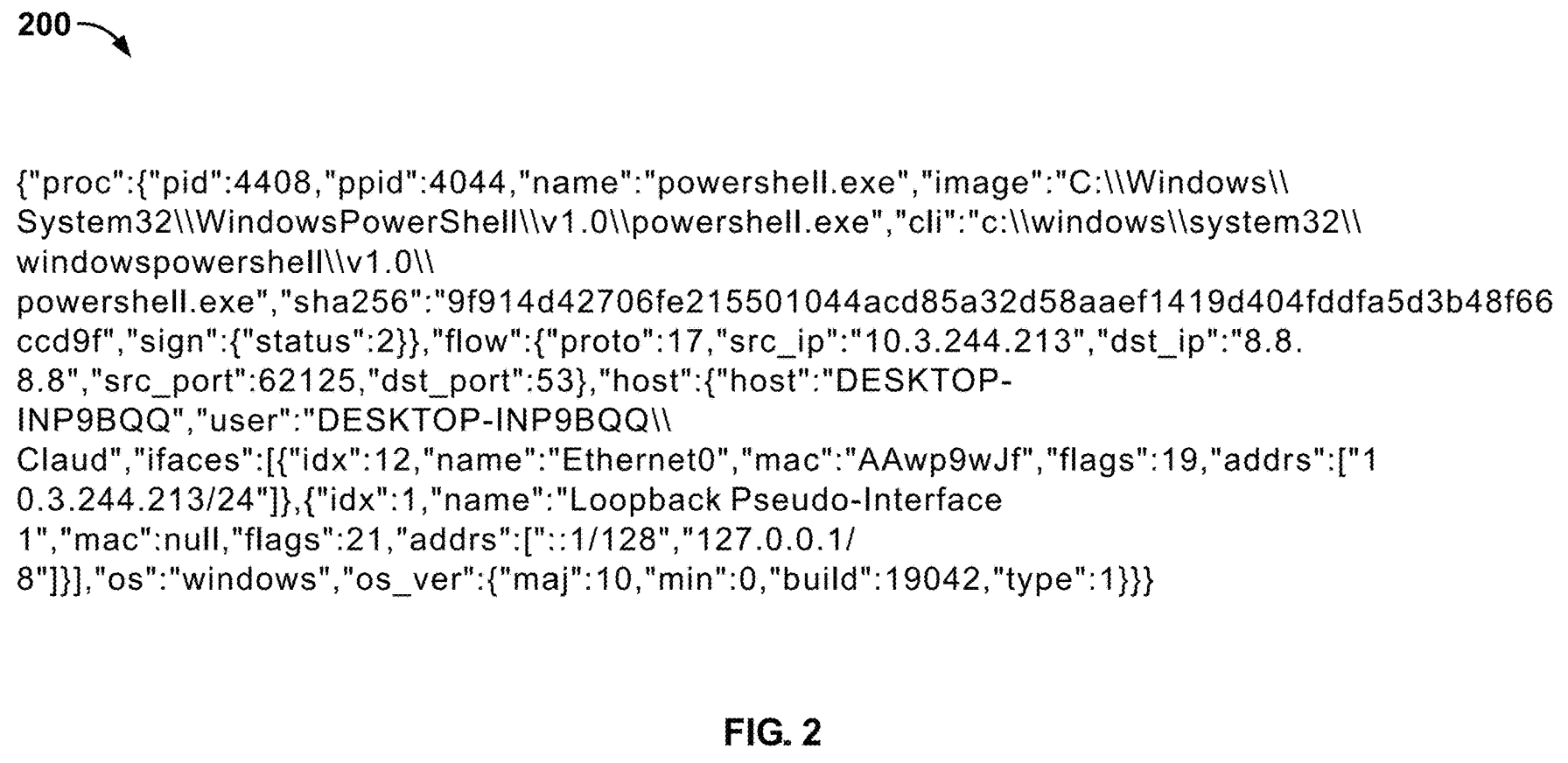

200

{"proc":{"pid":4408,"ppid":4044,"name":"powershell.exe","image":"C:\\Windows\\System32\\WindowsPowerShell\\v1.0\\powershell.exe","cli":"c:\\windows\\system32\\windowspowershell\\v1.0\\powershell.exe","sha256":"9f914d42706fe21550 1044acd85a32d58aaef1419d404fddfa5d3b48f66 ccd9f","sign":{"status":2}},"flow":{"proto":17,"src_ip":"10.3.244.213","dst_ip":"8.8.8.8","src_port":62125,"dst_port":53},"host":{"host":{"host":"DESKTOP-INP9BQQ","user":"DESKTOP-INP9BQQ\\Claud","ifaces":[{"idx":12,"name":"Ethernet0","mac":"AAwp9wJf","flags":19,"addrs":["10.3.244.213/24"]},{"idx":1,"name":"Loopback Pseudo-Interface 1","mac":null,"flags":21,"addrs":["::1/128","127.0.0.1/8"]}],"os":"windows","os_ver":{"maj":10,"min":0,"build":19042,"type":1}}}

DETERMINE THAT APPLICATION IS ACCESSING
INTERNET USING DOMAIN NAME

420

IDENTIFY PROCESS INFORMATION ASSOCIATED
WITH APPLICATION ALONG WITH ASSOCIATED
DOMAIN NAME SYSTEM (DNS) QUERY

430

SEND PROCESS INFORMATION AND ASSOCIATED
DNS QUERY TO DNS SECURITY SERVICE

440

PERFORM ACTION BASED ON RESPONSE FROM
DNS SECURITY SERVICE

METHOD AND SYSTEM FOR PROVIDING DNS SECURITY USING PROCESS INFORMATION

CROSS REFERENCE TO OTHER APPLICATIONS

This application is a continuation of U.S. patent application Ser. No. 18/077,516, entitled METHOD AND SYSTEM FOR PROVIDING DNS SECURITY USING PROCESS INFORMATION filed Dec. 8, 2022 which is incorporated herein by reference for all purposes, which is a continuation of U.S. patent application Ser. No. 17/724,130, entitled METHOD AND SYSTEM FOR PROVIDING DNS SECURITY USING PROCESS INFORMATION filed Apr. 19, 2022 which is incorporated herein by reference for all purposes.

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

FIG. 2 illustrates an example of process information.

DETAILED DESCRIPTION

Figure 1A:
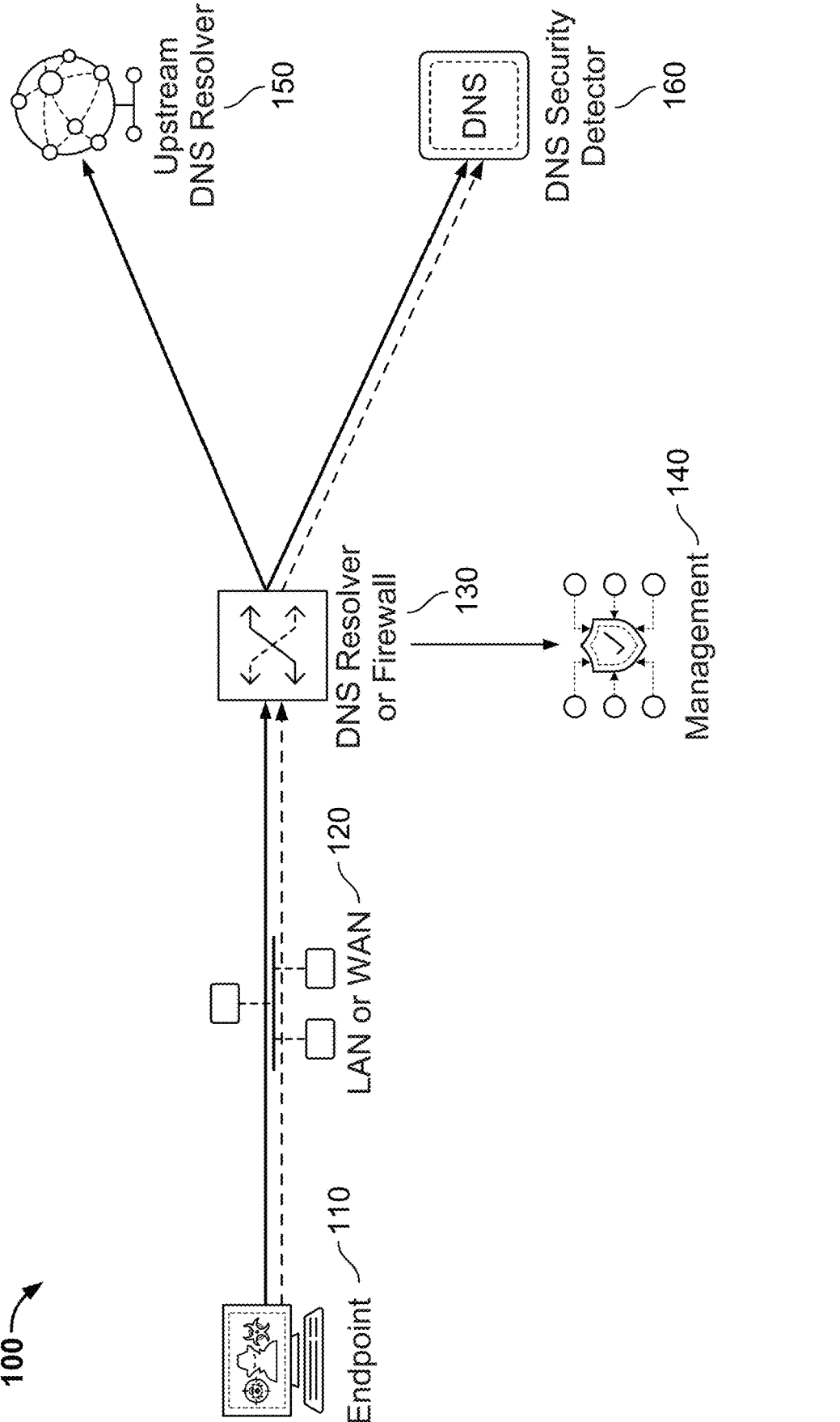
FIG. 1A illustrates an embodiment of an environment for providing DNS security using process information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventionally, when an endpoint is infected with malware (e.g., command and control malware), the endpoint can generate a large amount of DNS queries using a series of benign domains in sequence. To determine whether an endpoint has been infected with malware, DNS security services can review a very large amount of DNS queries and employ a domain generation algorithm (DGA) technique on the DNS queries to identify the endpoint including the malware. It could be beneficial to filter DNS queries so that DNS queries from non C&C processes and/or applications can be filtered out and a DGA technique can be applied to DNS queries associated with a specific process and/or a specific application to increase the accuracy of the DGA technique (e.g., reduce false positives and false negatives).

In some embodiments, a system/method/computer program product for providing DNS security using process information includes determining that an application is accessing an internet service using a domain name; identifying process information associated with the application along with an associated Domain Name System (DNS) query to identify an IP address associated with the domain name; sending the process information and the associated DNS query to a DNS security service; and performing an action based on a response from the DNS security service.

In some embodiments, the identifying of the process information associated with the application along with the associated DNS query to identify the IP address associated with the domain name includes diverting the associated DNS query from an external resolver to another resolver, wherein the diverted associated DNS query includes the process information.

In some embodiments, the process information includes process ID and one or more of the following: hostname, active directory domain, operating system type and version, and/or network interface.

3

In some embodiments, the process information includes process ID and one or more of the following: process meta information, user meta information, and/or endpoint meta information.

In some embodiments, the diverted associated DNS query includes the process information using extension mechanisms for DNS.

In some embodiments, the DNS query is sent to a DNS resolver.

In some embodiments, the performing of the action includes determining whether the domain name is associated with a set of known domain names allowed to communicate with the application; and in response to a determination that the domain name is not associated with the set of known domain names allowed to communicate with the application, block or sinkhole the associated DNS query.

In some embodiments, the performing of the action includes determining whether the process information is related to a newly registered domain and the process information is related to a system process; and in response to a determination that the process information is related to the newly registered domain and the process information is related to the system process, blocking or sinkholing the associated DNS query.

In some embodiments, the performing of the action includes determining whether the process information is related to an unsigned process; and in response to a determination that the process information is related to the unsigned process, blocking or sinkholing the associated DNS query.

In some embodiments, the performing of the action includes quarantining an endpoint associated with the application.

In some embodiments, the performing of the action includes removing a file associated with the process information.

FIG. 1A illustrates an embodiment of an environment for providing DNS security using process information. In some embodiments, the environment 100 includes an endpoint 110 connected to a local area network (LAN) or a wide area network (WAN) 120 that is connected to a DNS resolver or firewall 130 that resolves DNS requests or uses an upstream DNS resolver 150 and a DNS security detector 160 that detects malicious or unwanted DNS messages.

In some embodiments, a process or an application running on the endpoint 110 connected to the LAN or the WAN 120 attempts to access the Internet. To access the Internet, e.g., to access an Internet service, or to access an Internet resource, the process or the application 110 can utilize a domain name, which is to be first resolved, to access the Internet service or the Internet resource. To utilize the domain name, the process or the application 110 can attempt to access the Internet service or the Internet resource via a domain name, and an agent running on the endpoint 110 can intercept the network call including the domain name and divert or steer a domain name system (DNS) query originally going to the upstream DNS resolver 150 to a DNS resolver or firewall 130. In some embodiments, the diverted DNS query is sent to the DNS resolver or the firewall 130 over Hypertext Transfer Protocol Secure (HTTPS) and the diverted DNS query includes, in addition to the original DNS query, process information including process ID and one or more of the following: endpoint metadata, user metadata, and/or process metadata. In some embodiments, the process information includes process ID and one or more of the following: hostname, active directory domain, operating system type and version, and/or network interface.

In some embodiments, the endpoint 110 is a computer, a laptop, a mobile phone, a tablet, etc. Typically, when a process or an application loaded on the endpoint 110 attempts to access the Internet using a domain name, an agent built in the operating system running on the endpoint 110 obtains the DNS query to obtain an IP address relating to the domain name and forwards the DNS query to a DNS resolver to obtain an IP address based on the domain name included in the DNS query. In some embodiments, the DNS query can be forwarded to the DNS Security Detector 160 by the DNS resolver or firewall 130. In some embodiments, the DNS Security Detector 160 detects malicious or unwanted DNS messages.

In some embodiments, the DNS resolver or firewall 130 communicates with the management 140 for configuration (e.g., policy management) and/or logging.

Typically, major operating systems (e.g., Windows, MacOS, Linux, etc.) have a mechanism to provide additional metadata for an established TCP or UDP flow in the kernel. In some embodiments, the additional metadata includes process information including a process ID.

First, an Agent obtains control of DNS messages.

As an example, in a computer running the Windows operating system (OS), the Window operating system provides a user space program to obtain control of any outgoing DNS query, which can be referred to as traffic diverting, traffic steering, or traffic redirecting. In Windows, a Windows Filtering Platform (WFP) framework allows the user space program to install a kernel driver into the WFP framework to divert any specified outgoing IP packets to the user space program.

In another example, in a computer running MacOS, a NetworkExtension framework is provided for a user space program to extend the kernel's network capabilities. An API called NEDNSProxyProvider can allow the user space program to control outgoing DNS traffic. Alternatively, the user space program can use the firewall in MacOS's BSD kernel to redirect outgoing DNS queries to a local proxy.

In yet another example, in a computer running Linux, a netfilter framework provides an iptables target NFQUEUE that allows the redirection of any kind of traffic from the kernel to a user space proxy. As an example, an iptables rule for TCP and UDP traffic for port 53 can be configured to be redirected to NFQUEUE, which can allow an agent to control the DNS queries.

Alternatively, in some embodiments, an agent being executed on an endpoint running any operating system can function as a DNS proxy by listening to UDP or TCP port 53 at a local host (e.g., 127.0.0.1), and the endpoint configures the local host (e.g., 127.0.0.1) to be the default DNS server. In this embodiment, a user or a system administrator would need to specially configure the endpoint to have this configuration via, for example, a manual configuration or a script executed upon login.

Secondly, the agent obtains information of the process that produced the DNS query.

As an example, in a computer running the Windows operating system (OS), a user program could install a WFP driver to obtain the process ID of each flow.

In another example, a computer running MacOS, using a virtual interface called "pktap" (packet TAP), can mirror traffic from any network interface and enrich the traffic with the corresponding process information including the process ID. For each packet captured from the "pktap" interface, the packet's header can include the process information including the process ID.

Subsequently, DNS security can be performed using the process information which includes the process ID.

Figure 1B:
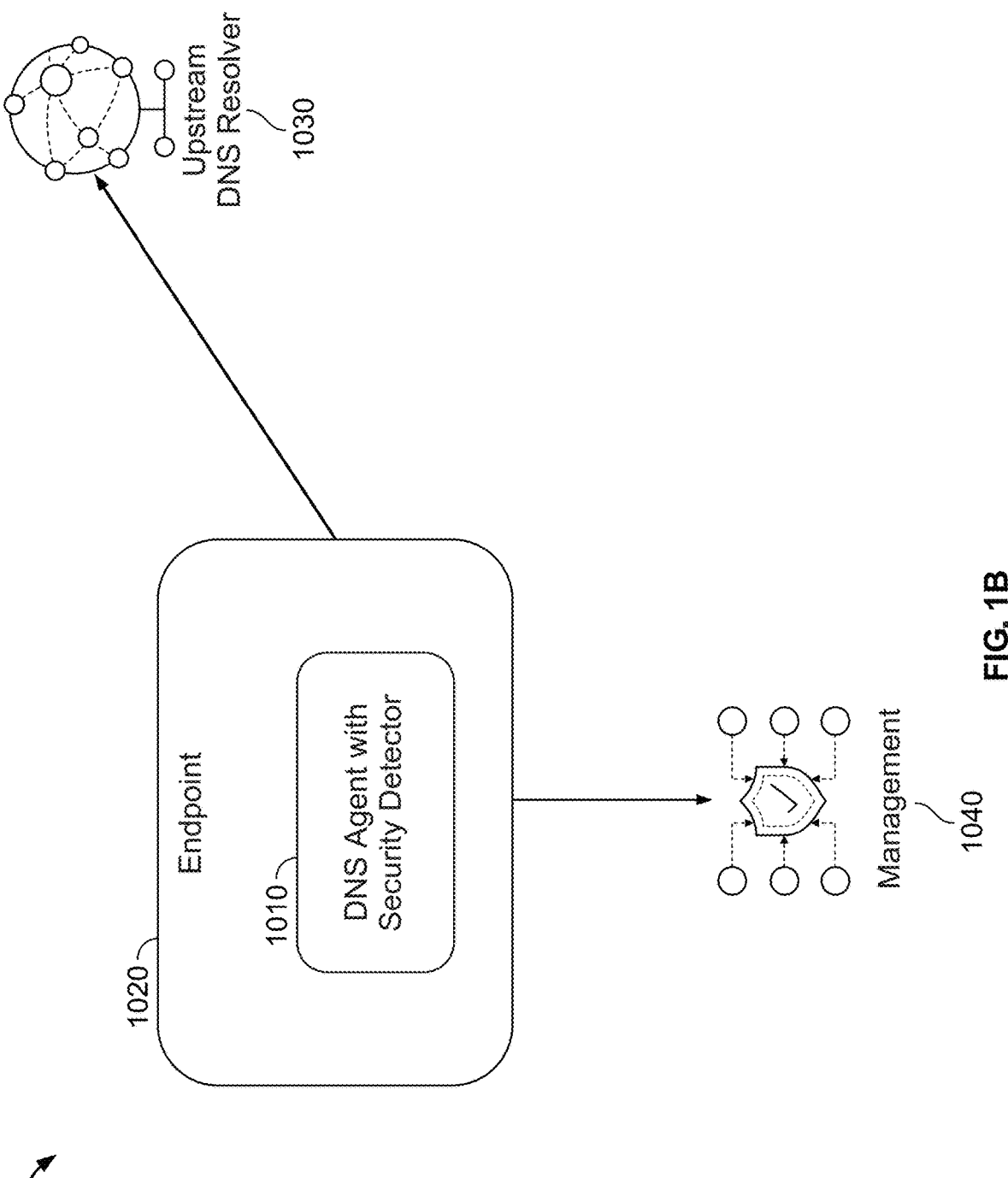
FIG. 1B illustrates another embodiment of an environment for providing DNS security using process information.

FIG. 1B illustrates another embodiment of an environment for providing DNS security using process information. In some embodiments, the environment 1000 includes an endpoint 1020 including a DNS agent with a security detector 1010. Management 1040 corresponds with the management 140 of FIG. 1A, and the upstream DNS resolver 1030 corresponds with the upstream DNS resolver 150 of FIG. 1A.

In some embodiments, in the environment 1000, the DNS agent with the security detector 1010 is running on the endpoint 1020, and performs DNS security detection within the endpoint 1020. If the DNS query is determined to be allowed by the security detector 1010, the DNS agent with the security detector 1010 communicates with the upstream DNS resolver 1030 to resolve the DNS query.

In some embodiments, the DNS agent with the security detector 1010 communicates with the management 1040 for configuration and/or logging.

Figure 1C:
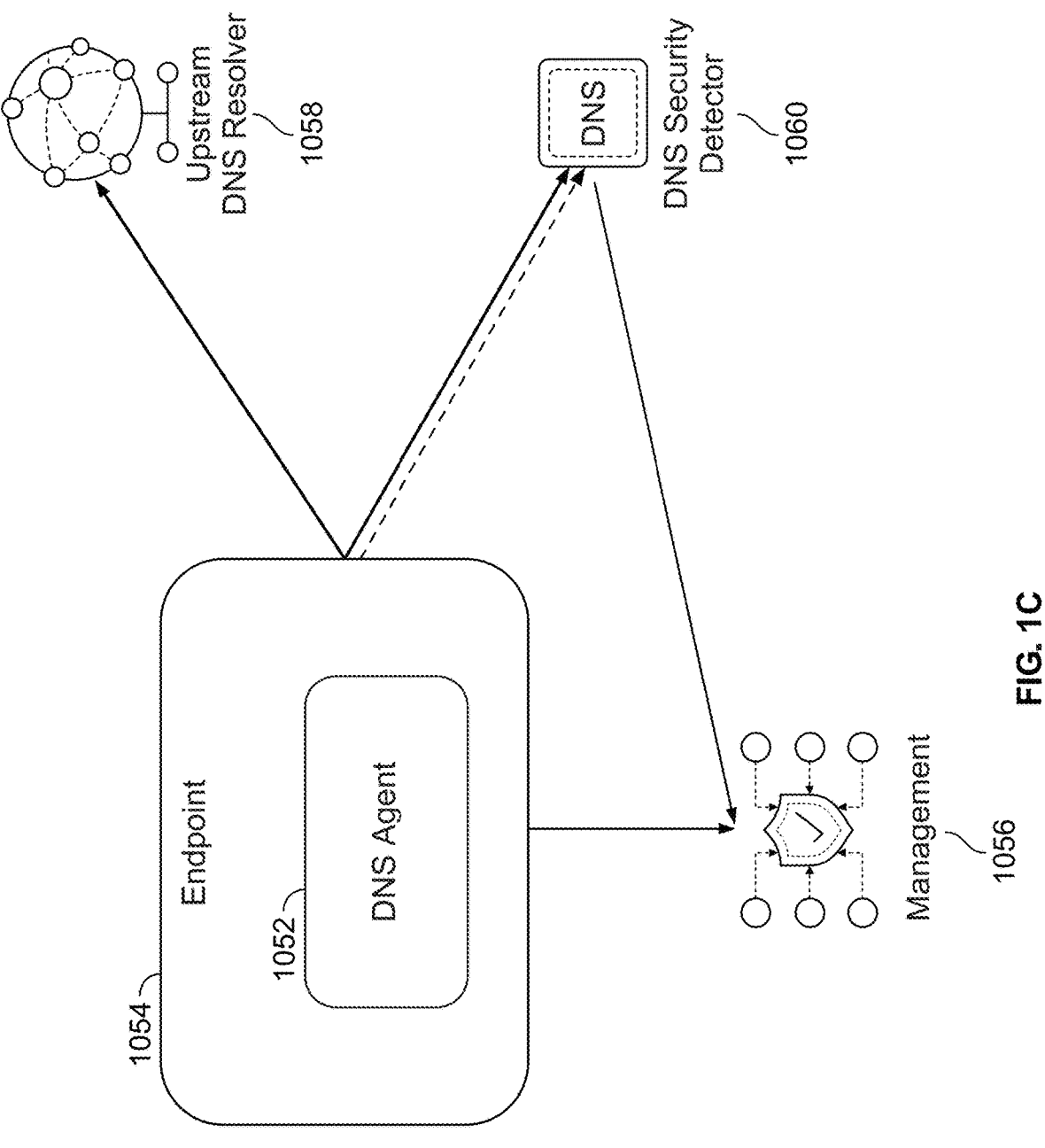
FIG. 1C illustrates yet another embodiment of an environment for providing DNS security using process information.

FIG. 1C illustrates yet another embodiment of an environment for providing DNS security using process information. In some embodiments, the environment 1050 includes an endpoint 1054 including a DNS agent 1052 that communicates with a DNS security detector 1060. Management 1056 corresponds with the management 140 of FIG. 1A, and the upstream DNS resolver 1058 corresponds with the upstream DNS resolver 150 of FIG. 1A.

In some embodiments, in the environment 1050, the DNS agent 1052 is running on the endpoint 1054, and controls the DNS traffic and correlates the DNS traffic with corresponding processes. As an aspect, the DNS agent 1052 does not perform any DNS security. The DNS agent 1052 forwards DNS messages to the DNS security detector 1060 for performing DNS security and providing results on whether the DNS query should be allowed to proceed. If the DNS query is determined to be allowed to proceed by the DNS security detector 1060, the DNS agent 1052 forwards the DNS query to the upstream DNS resolver 1058 to resolve the DNS query.

In some embodiments, the DNS agent 1052 and the DNS security detector 1060 communicate with the management 1056 for configuration and/or logging.

Figure 1D:
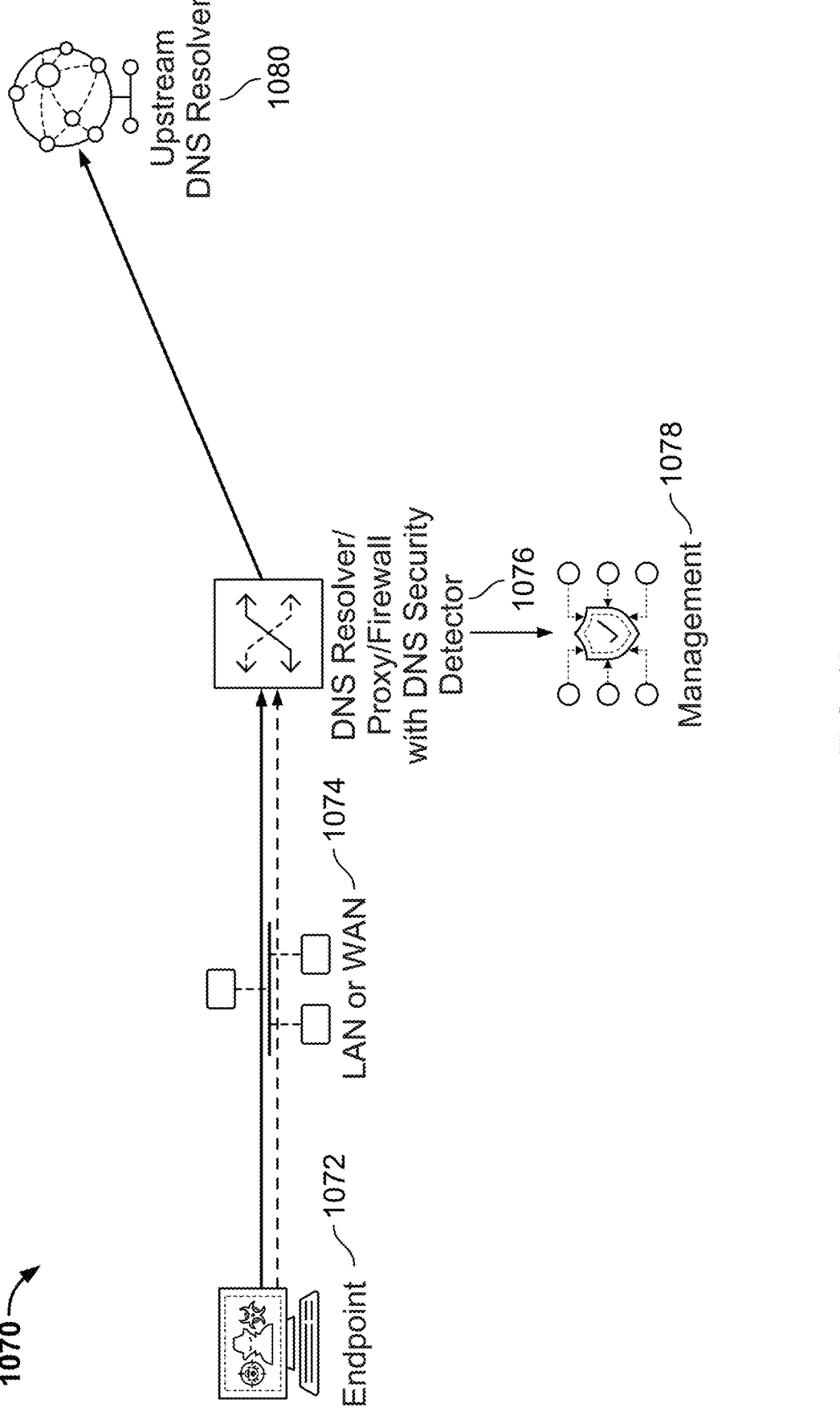
FIG. 1D illustrates yet another embodiment of an environment for providing DNS security using process information.

FIG. 1D illustrates yet another embodiment of an environment for providing DNS security using process information. In some embodiments, the environment 1070 includes an endpoint 1072 that communicates with a DNS resolver/proxy/firewall including a DNS security detector 1076 via a LAN or WAN 1074. Management 1078 corresponds with the management 140 of FIG. 1A, and the upstream DNS resolver 1080 corresponds with the upstream DNS resolver 150 of FIG. 1A.

In some embodiments, in this environment 1070, the DNS agent running on the endpoint 1072 does not directly talk with a public resolver or a separate DNS security detector, and communicates with a dedicated DNS resolver/proxy/firewall including the DNS security detector 1076, which receives the DNS query and process information, and the DNS security detector determines whether the DNS query should be allowed to proceed. If the dedicated DNS resolver/proxy/firewall including the DNS security detector 1076 determines that the DNS query should be allowed to proceed, the dedicated DNS resolver/proxy/firewall including the DNS security detector 1076 forwards the DNS query to the upstream DNS resolver 1080 to resolve the DNS query.

In some embodiments, the dedicated DNS resolver/proxy/firewall including the DNS security detector 1076 communicates with the management 1078 for configuration and/or logging.

FIG. 2 illustrates an example of process information.

In some embodiments, when the DNS agent running on the endpoint obtains the process information associated with an outgoing DNS query, the DNS agent sends the DNS query with the process information to a DNS resolver or firewall, which includes a DNS security detector or forwards to a DNS security detector. In some embodiments, the DNS query with the process information is sent in a valid DNS message, or other formats (e.g., JavaScript Object Notation (JSON), Extensible Markup Language (XML), etc.). In some embodiments, the DNS query with the process information is encoded as a standard DNS message and transferred via an HTTPS protocol. To add the process information to the original DNS query, the process information can be added via the DNS protocol's EDNS0 option (or a standard extension mechanism for DNS), as defined in RFC 5891.

In the example, the process information 200 is stored as a serialized JSON string and includes Process ID 4408, Parent Process ID 4044, Process Name "powershell.exe," Process Executable Image Path "c:\\windows\\system32\\windowspowershell\\v1.0\\ powershell.exe," Process Command Line, including arguments "C:\\Windows\\System32\\Windows PowerShell\\v1.0\\powershell.exe," Process Executable File's SHA256 value "sha256": "9f914d42706fe215 501044acd85a32d58aacf1419d404fddfa5d3b48f66ccd9f," and Process Executable File's Code Signing Status "2." In some embodiments, the process information further includes a Code Signing Certificate, which can be obtained via parsing the Process Executable File. As an example, the Code Signing Certificate is located via a parsing of Process Executable File (e.g. a Windows Portable Executable (PE) file), which is located using the Process Executable Image Path.

In the example, the metadata 200 further includes Endpoint's hostname "DESKTOP-INP9BQQ," Current User's name "DESKTOP-INP9BQQ\\Claud," Endpoint's Operating System "windows", Operating System Version Information "10," etc.

Figure 3:
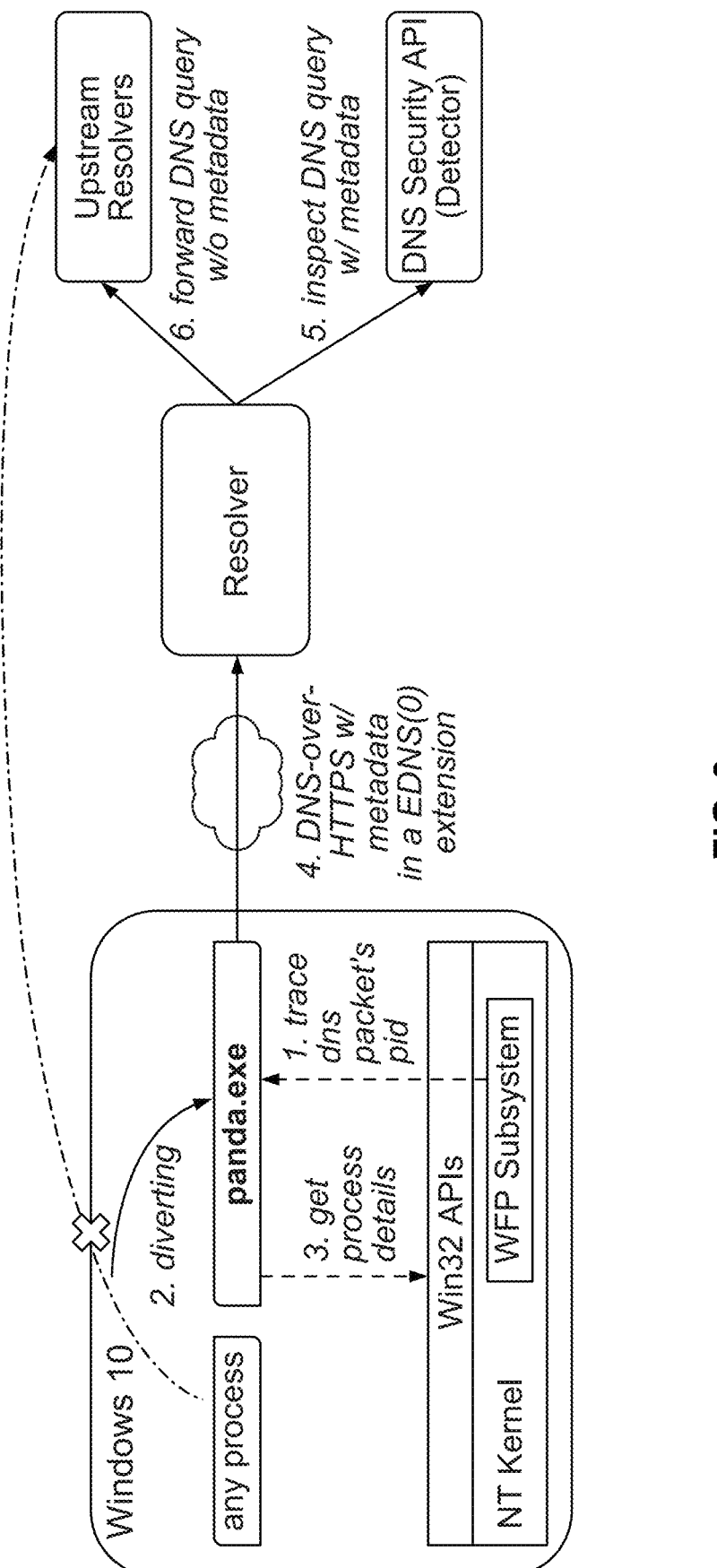
FIG. 3 illustrates an example of a workflow for providing DNS security using process information.

FIG. 3 illustrates an example of a workflow for providing DNS security using process information. The workflow 300 is an implementation on Windows, and includes the following operations:

In some embodiments, operations 1 and 3 are running in parallel in different threads. For example, both operations rely on kernel callbacks and no guarantee exists of which operation is performed first. In other words, operation 1 and operation 3 are labeled to distinguish the two operations but do not necessarily mean that operation 3 is performed after operation 1.

In operation 1, a DNS agent can trace, using Windows' WFP subsystem (FWPM_LAYER_ALE_FLOW_ESTAB-LISHED_V4 layer), all established TCP or UDP flow having a destination port of 53. Whenever a new DNS flow is established, the DNS agent obtains the flow information, which includes source IP, source port, destination IP, destination port, and a process ID.

In operation 2, the DNS agent diverts, using Windows' WFP subsystem (FWPM_LAYER_OUTBOUND_IP-PACKET_V4 layer), any outgoing TCP or UDP packet in the event that the packet's destination port is 53. In some embodiments, diverting means that the packet is not to be transmitted to its original destination. Also, the DNS agent can attempt to obtain the process information based on the 4 tuple or the flow information (source IP, source port, destination IP, and destination port) from the lookup structure. In the event that the process information is not there, the DNS agent can wait (e.g., 100 milliseconds) to allow operation 1 to be completed.

A relationship between the 4 tuple or the flow information (source IP, source port, destination IP, and destination port) and the process information is updated into a lookup structure, such as a lookup table in memory.

In operation 3, after the flow information is obtained, the DNS agent can obtain, using standard Windows APIs, process information such as, for example, name, command line, executable path, executable code signature, etc.

In operation 4, after the DNS agent has obtained the original DNS query packet and the process information associated with the original DNS query packet, the DNS agent can construct the DNS Resource Record (RR) in type of OPT (a type of pseudo-record defined in the DNS protocol) with data of serialized process information, insert the RR into the original DNS query message using a technique as defined by Extension Mechanisms for DNS (EDNS0) to obtain an extended DNS query, and forward the extended DNS query to a specific DNS resolver (e.g., a DNS resolver controlled by the client) via a specified protocol (e.g., HTTPS) in a format defined by the DNS-over-HTTPS Standard.

In operation 5, the specified DNS resolver can parse the extended DNS query to obtain the process information from the RR and the original DNS query, send all of the process information and the original DNS query to a DNS Security API (Detector), and wait for a response on whether the DNS query is malicious or unwanted from the DNS Security API (Detector) and whether the original DNS packet should be blocked based on the current policy.

In the event that the original DNS query is disallowed by the DNS Security API (Detector), the specified DNS resolver can either stop resolving or terminate the extended DNS query with the DNS agent and accordingly, the original DNS query will time out, or the specified DNS resolver can provide to a pre-configured sinkhole IP address to the DNS agent so that the original DNS query will resolve to the pre-configured sinkhole IP address.

In some embodiments, alerts and logs can be provided in this operation on either the specified DNS resolver side and/or the DNS Security API (Detector) side.

In operation 6, in the event that the original DNS query is allowed by the DNS Security API (Detector), the specific DNS resolver can send the original DNS query to an upstream DNS resolver. The upstream DNS resolver can be a specific public DNS resolver (e.g., 8.8.8.8), an enterprise customer's internal DNS resolver, the original DNS query's original destination IP address, etc.

After the results from the upstream DNS resolver are obtained, the specified DNS resolver can forward the response back to the DNS agent by the DNS-over-HTTP Standard in a DNS-over-HTTPS response, and the DNS agent can return a response to the original DNS resolver through the diverted API interface so that the original process that initiated the query receives its DNS response.

Afterwards, the DNS agent can perform an action based on the DNS query and the process information.

Figure 4:
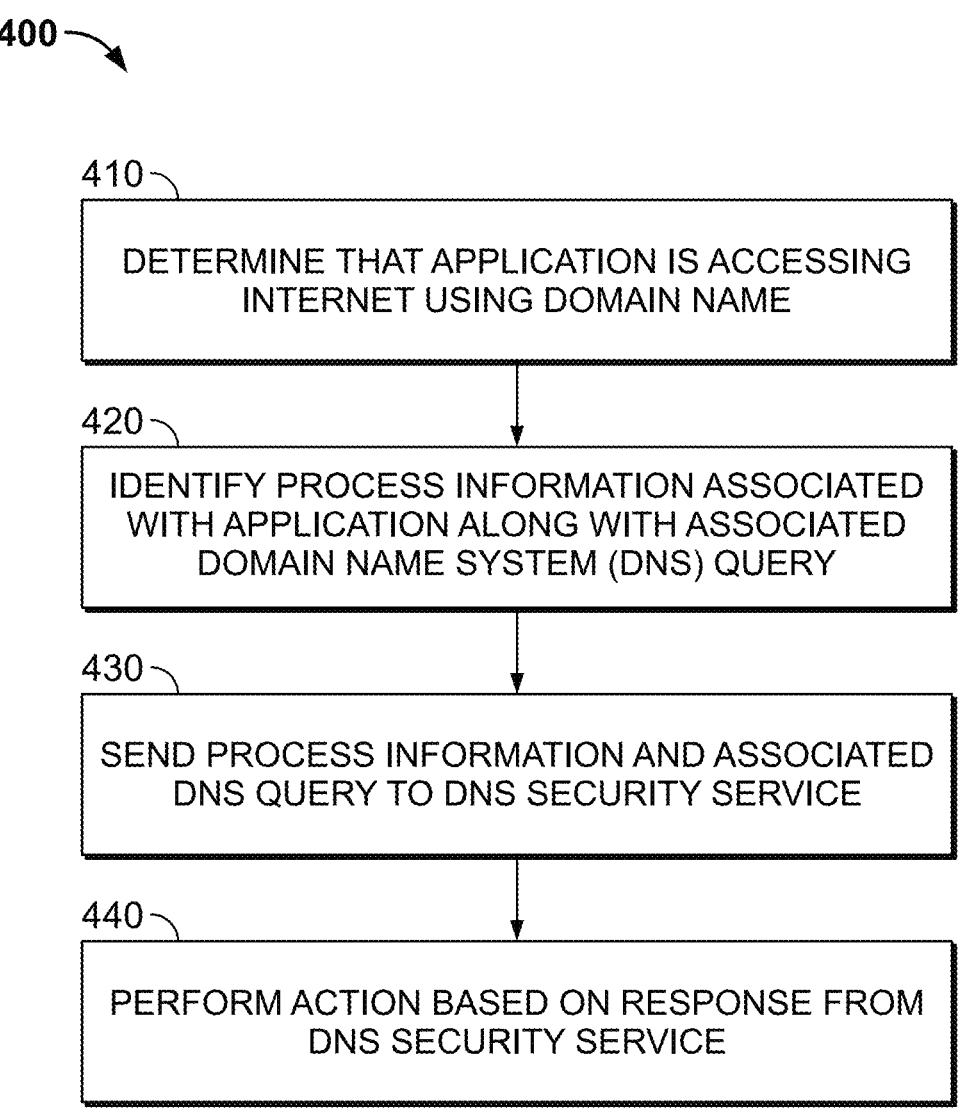
FIG. 4 is a flow diagram illustrating an embodiment of a process for providing DNS security using process information.

FIG. 4 is a flow diagram illustrating an embodiment of a process for providing DNS security using process information. In some embodiments, the process 400 is implemented using a DNS agent being executed on endpoint 110 of FIG.

1A, a DNS agent 1010 of FIG. 1B, a DNS agent 1052 of FIG. 1C, or an agent being executed on an endpoint 1072 of FIG. 1D and comprises:

In 410, the DNS agent determines that an application is accessing an internet service using a domain name. For example, the DNS agent detects that a browser (e.g., Google Chrome or Microsoft Edge) being executed on an endpoint is attempting to access facebook.com or a malicious application is attempting to access A2d34xxx.com.

In 420, the DNS agent identifies process information associated with the application along with an associated Domain Name System (DNS) query to identify an IP address associated with the domain name. For example, the DNS agent identifies the DNS query and the process information including a process ID 4103 associated with the browser or the malicious application attempting to access the Internet using a domain name.

In 430, the DNS agent sends the process information and the associated DNS query to a DNS security service.

In 440, the DNS agent performs an action based on a response from the DNS security service. In some embodiments, in the event that the response from the DNS security service indicates that the associated DNS query is malicious or unwanted, the action includes one or more of the following: drop the DNS query or response, sinkhole the DNS query, send an alert to a user, and/or write a log to a management system. In some embodiments, the action includes to quarantine an endpoint associated with the application or the process, remove a file associated with the process information, terminate the process that issued the DNS query, etc.

Some of the benefit of the process 400 include by including the process information along with a DNS request increased accuracy in DGA detection (e.g., increased recall rate, decreased false positive rate, etc.), increased accuracy in detecting malware that uses a sequence of benign domains (e.g., Twitter, Github, Blogspot) for command and control communications, increased accuracy in detecting abnormal traffic that a legitimate process should not transmit, etc. In addition, the process information can also provide a more fine-grained context of compromise, and lead to more fine-grained actions, such as to terminate a specific process, quarantine a specific set of malicious files, etc.

Figure 5:
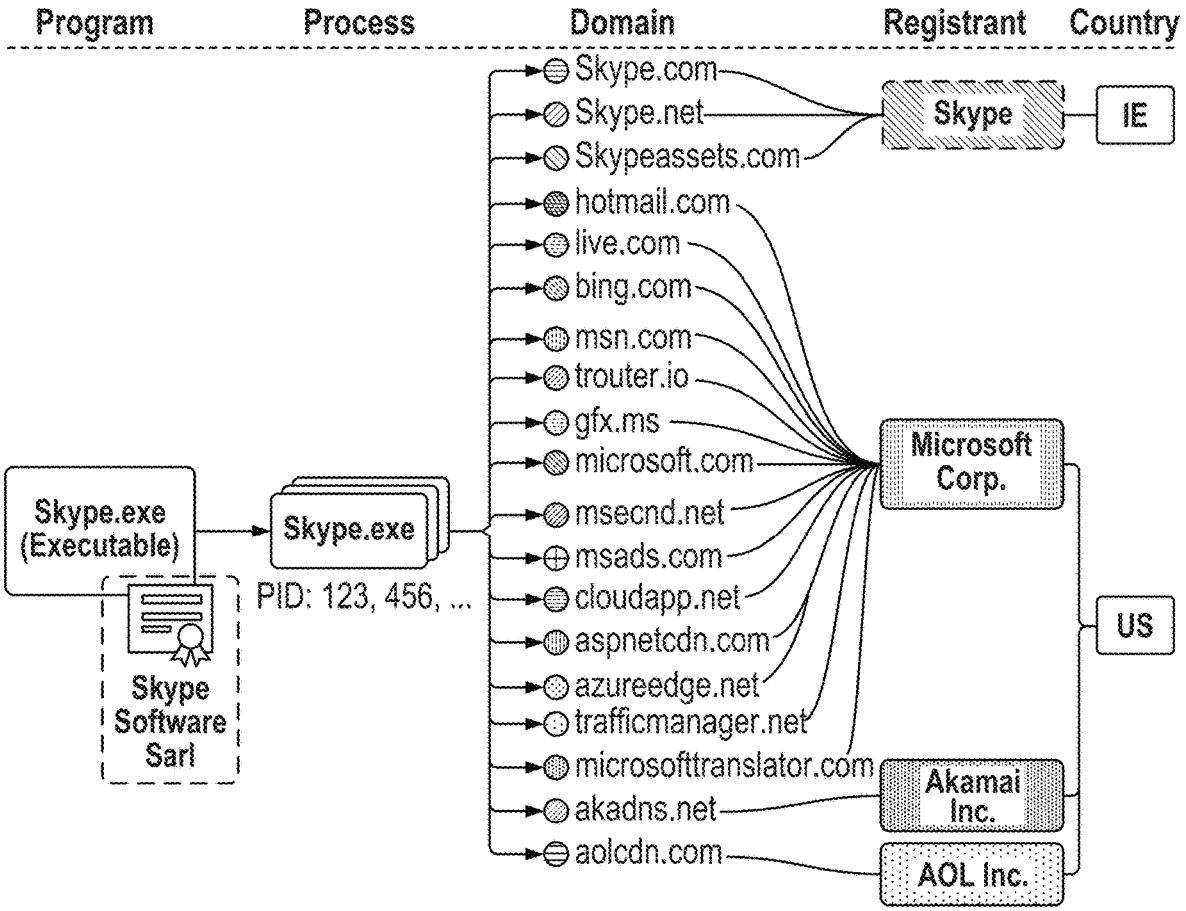
FIG. 5 illustrates an example of detecting an anomaly using a DNS profile.

FIG. 5 illustrates an example of detecting an anomaly using a DNS profile.

In the example, a DNS profile of a process includes a group of domains that are associated with a registrant. For example, in a Skype profile, domains "skype.com," "skype.net," and "skypeassets.com" are associated with the Skype.exe process. In another example, in an Akamai profile, the domain "akadns.net" is associated with the registrant "Akamai Inc." In yet another example, in an AOL profile, the domain "aolcdn.com" is associated with the registrant "AOL Inc." In yet another example, in a Microsoft profile, there are many domains "Hotmail.com," et al. associated with the registrant "Microsoft Corp."

After the DNS profiles are established, when a DNS query is received from a process (e.g., skype.exe), a DNS agent determines whether a domain associated with the DNS query is found in a list of known domains (e.g., a list of domains associated with the established profiles), and in the event that the domain is found in the list of known domains, the DNS agent can make a determination that the domain is found in the list of known domains, and can, subsequently, block or sinkhole the DNS query and/or send an alert.

In another example, using a profile for a "powerpoint.exe" process, after reviewing numerous logs, a determination can be made that "powerpoint.exe" queries domains related to update.microsoft.com and download.microsoft.com and both Microsoft domains are registered to Microsoft. Accordingly, in the event that "powerpoint.exe" queries a domain not related to Microsoft.com, a verdict of abnormal domain can be made.

In yet another example, some malware utilizes several legitimate web services for its command and control (C2) communications. For example, a malware can use twitter.com, github.com, and dropbox.com for C2 communications. In the example, each of the three queries is legitimate; however, a single process that queries those three domains in sequence within a defined time period is suspicious. Since DNS queries can be grouped based on process IDs, a process that makes DNS queries match a known pattern/sequence of legitimate domains within a predefined period of time can be determined to be malicious.

In yet another example, the DNS security detector can determine whether process information is related to a newly registered domain and is related to a system process, and if the DNS security detector determines that the process information is related to the newly registered domain and is related to the system process, the DNS security detector can determine that the process or application that issued the DNS query is malware.

In yet another example, the DNS security detector can determine whether the process information is related to an unsigned process, and if the DNS security detector determines that the process information is related to an unsigned process, the DNS security detector can determine that the process or application that issued the DNS query is malware.

In yet another example, having process information associated with DNS queries allows for increased accuracy for DGA and DNS tunneling detection.

For example, assume that 5 DNS queries are received in one minute, each domain of a DNS query is 5 characters of random letters and/or digits with a 2-character length top-level domain (TLD), and at least one of the domains is an NXDOMAIN (Not registered domain). In this example, because the 5 DNS queries are coming from the same source process, it can be determined that the process generating the DNS queries is the malware Qsnatch.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a memory; and
   a processor coupled to the memory and configured to:
      receive process information associated with an application along with an associated Domain Name System (DNS) query to identify an IP address associated with a domain name associated with the application, wherein the application is accessing an Internet service using the domain name;
      send the process information and the associated DNS query to a DNS security service; and
      perform an action based on a response from the DNS security service, comprising to:
         determine whether the process information is related to a newly registered domain and the process information is related to a system process; and
         in response to a determination that the process information is related to the newly registered domain and the process information is related to the system process, block or sinkhole the associated DNS query.

2. The system of claim 1, wherein the process information includes process ID and one or more of the following: hostname, active directory domain, operating system type and version, and/or network interface.

3. The system of claim 1, wherein the process information includes process ID and one or more of the following: process meta information, user meta information, and/or endpoint meta information.

4. The system of claim 1, wherein the associated DNS query includes the process information using extension mechanisms for DNS.

5. The system of claim 1, wherein the DNS query is sent to a DNS resolver in the event that the action includes allowing the DNS query to be forwarded.

6. The system of claim 1, wherein the performing of the action comprises to:
   quarantine an endpoint associated with the application.

7. The system of claim 1, wherein the performing of the action comprises to:
   remove a file associated with the process information.

8. A method, comprising:
   receiving, using a processor, process information associated with an application along with an associated Domain Name System (DNS) query to identify an IP address associated with a domain name associated with the application, wherein the application is accessing an Internet service using the domain name;
   sending, using the processor, the process information and the associated DNS query to a DNS security service; and
   performing, using the processor, an action based on a response from the DNS security service, comprising:
      determining whether the process information is related to a newly registered domain and the process information is related to a system process; and
      in response to a determination that the process information is related to the newly registered domain and the process information is related to the system process, blocking or sinkholing the associated DNS query.

9. The method of claim 8, wherein the process information includes process ID and one or more of the following: hostname, active directory domain, operating system type and version, and/or network interface.

10. The method of claim 8, wherein the process information includes process ID and one or more of the following: process meta information, user meta information, and/or endpoint meta information.

11. The method of claim 8, wherein the associated DNS query includes the process information using extension mechanisms for DNS.

12. The method of claim 8, wherein the performing of the action comprises:
   quarantining an endpoint associated with the application.

13. A computer program product embodied in a non-transitory computer readable medium and comprising computer instructions for:
   receiving process information associated with an application along with an associated Domain Name System (DNS) query to identify an IP address associated with a domain name associated with the application, wherein the application is accessing an Internet service using the domain name;

sending the process information and the associated DNS query to a DNS security service; and performing an action based on a response from the DNS security service, comprising:

determining whether the process information is related to a newly registered domain and the process information is related to a system process; and in response to a determination that the process information is related to the newly registered domain and the process information is related to the system process, blocking or sinkholing the associated DNS query.

\* \* \* \* \*